United States Patent [19]
Kimura

[11] Patent Number: 6,073,646
[45] Date of Patent: Jun. 13, 2000

[54] GAS CONTROLLING DEVICE FOR INTEGRATION

[75] Inventor: Miyoshi Kimura, Yabuzuka Hon-Machi, Japan

[73] Assignee: Benkan Corporation, Tokyo, Japan

[21] Appl. No.: 08/929,853

[22] Filed: Sep. 15, 1997

[30] Foreign Application Priority Data

Sep. 30, 1996 [JP] Japan ................................ 8-276828
Apr. 7, 1997 [JP] Japan ................................ 9-102404

[51] Int. Cl.⁷ .............................. F16K 7/14; F16K 43/00
[52] U.S. Cl. ...................... 137/315; 137/549; 137/884; 251/331
[58] Field of Search ................................ 137/315, 884, 137/549; 251/61.1, 331, 335.2; 210/429, 432, 453

[56] References Cited

U.S. PATENT DOCUMENTS

| 675,711 | 6/1901 | Brophy | 137/549 |
| 1,959,105 | 5/1934 | McCarthy | 137/549 |
| 2,520,092 | 8/1950 | Frederickson et al. | 137/454.5 |
| 4,468,001 | 8/1984 | Stanic | 137/454.5 |
| 4,828,219 | 5/1989 | Ohmi et al. | 251/331 |
| 5,253,671 | 10/1993 | Kolenc | 251/331 |
| 5,337,785 | 8/1994 | Romer | 251/331 |
| 5,524,865 | 6/1996 | Uchisawa et al. | 251/331 |
| 5,653,419 | 8/1997 | Uchisawa et al. | 251/331 |
| 5,819,782 | 10/1998 | Itafuji | 137/884 |

*Primary Examiner*—George L. Walton
*Attorney, Agent, or Firm*—Ladas & Parry

[57] ABSTRACT

The present invention relates to a gas controlling device for integration such that it can be simply removed or mounted without disassembling a gas line in a high purity gas supply system for a semiconductor. The gas controlling device for integration comprises a main body which is vertically constituted and has a gas inlet passage and a gas outlet passage formed in a lower body, a nut mounted on an outer periphery of the lower body, a passage block having a gas inlet passage and a gas outlet passage, and a sealing means disposed between the lower body and the passage block. The lower body is inserted into the mounting hole of the passage block and is fixed to the passage block by screwing the nut. Since the gas controlling device for integration is fixed to the passage block by screwing the nut mounted on the outer periphery of the lower body, it can be removed or mounted only by loosening or tightening one nut without disassembling the gas line.

10 Claims, 13 Drawing Sheets

GAS CONTROLLING DEVICE FOR INTEGRATION

BACKGROUND OF THE INVENTION

1. Field of the Invention

The present invention relates to a gas controlling device for integration which is integrated for use on a panel for the desired uses such as a gas supply control, a gas cleanup or the like in a gas controlling device of a high purity gas supply system for a semiconductor.

2. Description of the Related Art

A gas controlling device of a high purity gas supply system for a semiconductor has been conventionally integrated in a crowded state, for example as shown in FIG. 1. In the figure, many gas lines 75 are arranged In parallel on a panel 70. The gas line 75 is provided with a filter 74, a valve 73, a block valve 72, and a mass flow controller 71 in order from an upstream side. Every gas controlling device of the above described gas line 75 is a part to be periodically replaced and it is very troublesome and takes much time to remove or to mount it in a crowded place. For example, when the filter 74 which is constituted transversely is removed, screws 76, 77 disposed on both sides thereof need to be loosened and moreover the gas line 75 needs to be partially loosened not to damage a sealing surface. Accordingly, to remove or to mount a filter, for example, all screws for fixing devices in the downstream such as a valve need to be loosened and hence a user has difficulty in performing operations such as periodical repair, periodical replacement or the like.

Moreover, since the main body of an automatic diaphragm valve, although not shown, needs to be mounted to a passage block with four bolts, it takes much time to mount it. Moreover, when the passage block is mounted on a pipeline in tight space, it must be tightened with four bolts via a metal C ring, a gasket or the like on the bottom and hence it takes much time to mount it and, if the tightening force of each bolt is not well balanced, a leak is apt to occur at the joint part of the bottom surface, thereby deteriorating reliability. Further, although there is a multiple valve such that a plurality of automatic diaphragm valves are mounted on the passage block for integration, it is uneconomical because all valves must be replaced when one valve needs to be replaced and, since it is mounted with a plurality of bolts, it is difficult to tighten the bolts for ensuring good sealing.

OBJECT OF THE INVENTION

It is an object of the present invention to provide a gas controlling device for integration such that it is simply removed or mounted without disassembling a gas line and that it can be simply periodically repaired or replaced by a user and moreover that it can be made compact to thereby reduce space for mounting in the gas line.

It is another object of the present invention to provide a gas controlling device for integration such that it can ensure tight sealing performance at a joint part to thereby improve reliability when it is mounted.

It is still another object of the present invention to provide a gas controlling device for integration such that, when it is removed from or mounted on a passage block of the device body, it can prevent particles produced at a threaded portion from entering a gas passage system through a mounting hole of the passage block to thereby improve reliability.

SUMMARY OF THE INVENTION

To solve the above described problems, a gas controlling device for integration according to the present invention comprises a main body of a gas controlling device which is vertically constituted and has a gas inlet passage and a gas outlet passage formed in a lower body, a nut mounted on an outer periphery of the above described lower body, a passage block which has an upward open mounting hole into which the above described lower body is inserted and has a gas inlet passage communicating with the above described gas inlet passage and a gas outlet passage communicating with the above described gas outlet passage, and a sealing means disposed between the above described lower body of the gas controlling device and the above described passage block, wherein the above described lower body is inserted into the above described mounting hole and is fixed to the above described passage block by screwing the above described nut in a state in which the above described gas inlet passages communicate with each other and the above described gas outlet passages communicate with each other.

In this regard, an automatic diaphragm valve, a toggle-type manual diaphragm valve, a filter unit, an automatic diaphragm valve with a check valve, a regulator , a mass flow controller, a mass flow meter or the like can be used as the gas controlling device for integration.

Moreover, in the above described constitution, the nut may have an external thread and may be screwed in the inside of the mounting hole of the passage block, or the nut may have an internal thread and may be screwed on the outside of the cylindrical projecting portion of the passage block.

Furthermore, in the above described constitution, a gasket which is disposed at a joint surface between the lower body of the gas controlling device and the passage block and has a plurality of gas passing holes is used as the sealing means. In this regard, the above described gasket may be constituted such that it has a gas passing hole of a gas inlet side and a gas passing hole of a gas outlet side and is formed in a single-piece or that two gaskets having a gas passing hole for each are combined and retained by a retainer.

Still furthermore, in the above described constitution, a gasket which is disposed between the bottom surface of the lower body of the gas controlling device and the bottom surface of the mounting hole of the passage block, which is opposite to the bottom surface of the lower body of the gas controlling and is projectingly formed such that it is raised up from the surrounding, and has a plurality of gas passing holes may be used as the sealing means. In this case, the above described gasket may be constituted such that it is a single-piece having a gas passing hole of a gas inlet side and a gas passing hole of a gas outlet side and that it is inserted into the groove to the bottom surface of the lower body and is positioned there.

According to the present invention having a constitution described above, the device body can be simply removed from or mounted on the mounting hole of the passage block only by loosening or tightening one nut without disassembling the gas line. Therefore, even a user can simply perform maintenance such as periodical repair, periodical replacement or the like. Moreover, since the device is vertically constituted and is compactly mounted on the gas panel, it can save space in the gas line.

Further, the gasket is disposed between the joint parts of the device body to thereby ensure tight sealing and the bottom surface of the mounting hole of the passage block is projectingly formed to thereby prevent the entry or the building-up of dirt at the sealing surface of the gasket when the device body is removed or mounted, whereby reliability in gas supply can be improved.

Still further, since a nut having an internal thread is screwed on the outside of the projecting portion of the passage block, it can prevent particles produced at the threaded portion when the device body is removed or mounted from entering the gas line through the mounting hole of the passage block, which can improve reliability in gas supply.

DETAILED DESCRIPTION OF THE PREFERRED EMBODIMENTS

Figure 1:
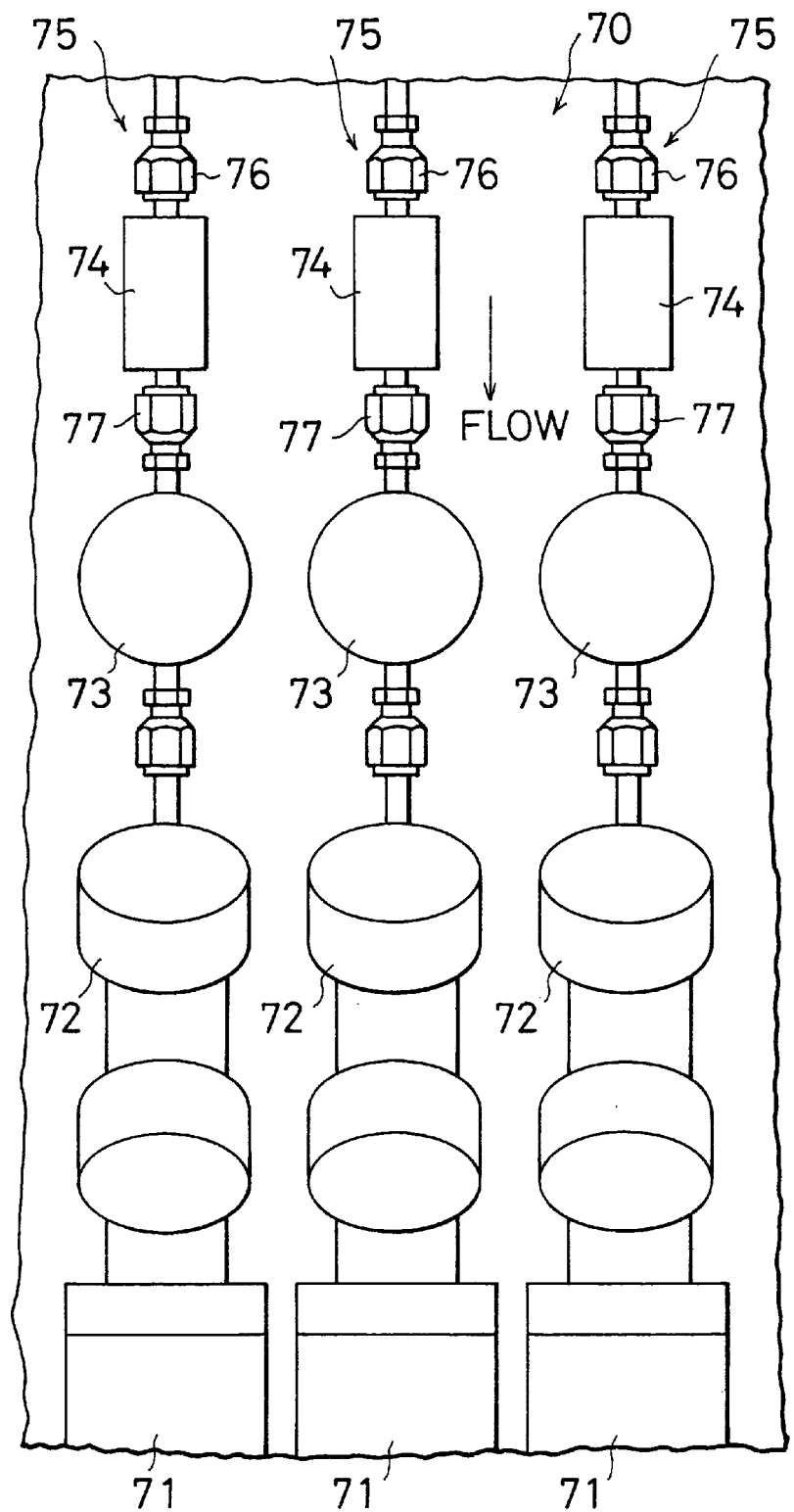
FIG. 1 is a plan view illustrating an example of a gas line in an integrated gas panel in the related art.
Figure 2:
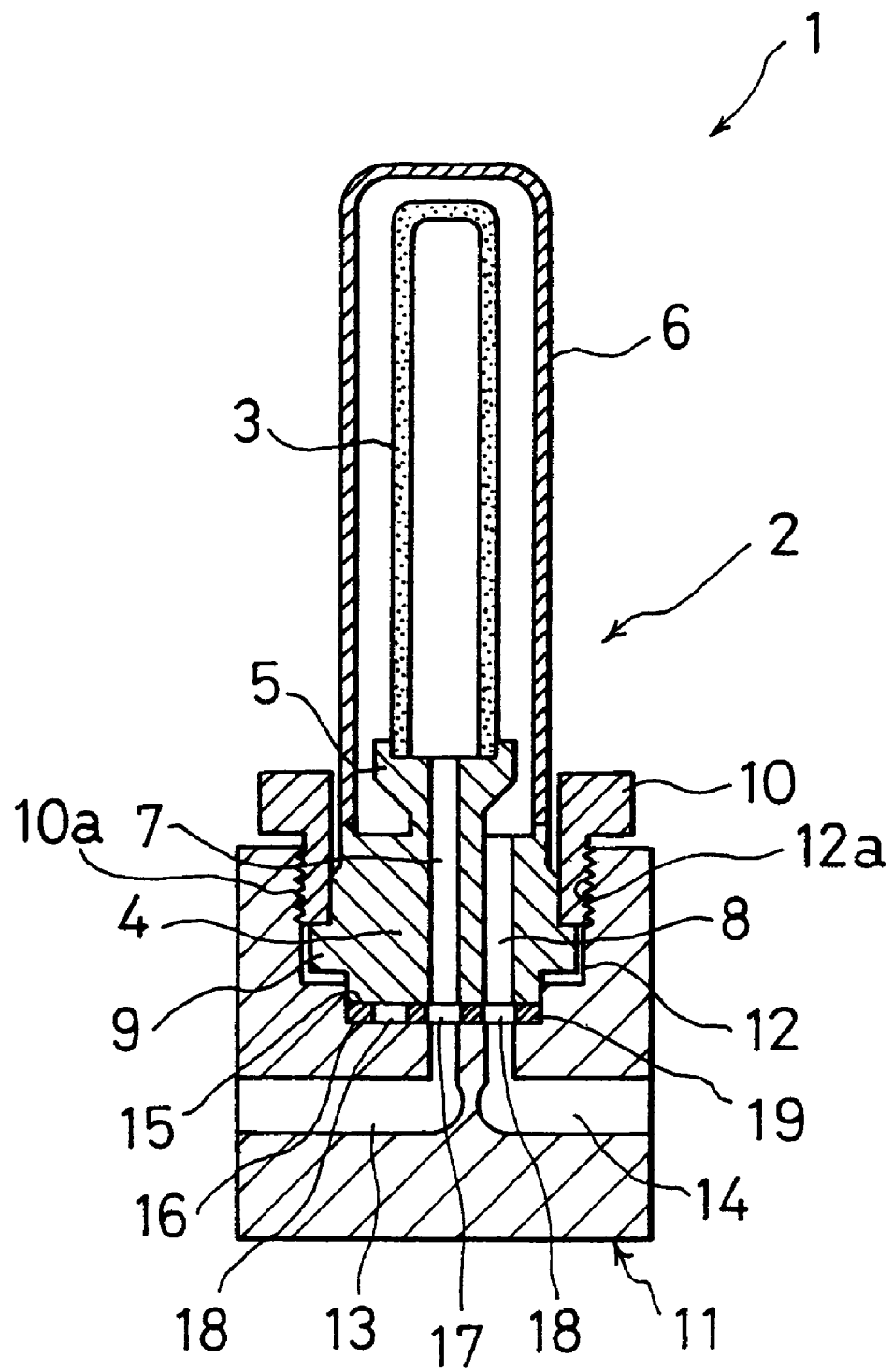
FIG. 2 illustrates the first preferred embodiment of a gas controlling device for integration according to the present invention and is a longitudinal sectional view of the main part thereof applied to a filter unit.

Up to this point, the object and the summary of the present invention have been described and the preferred embodiments of the present invention will be hereinafter described with reference to the drawings. First, the first embodiment using a nut of an external thread type will be described. In FIG. 2, a reference numeral 1 designates a filter unit used for a gas line in a gas controlling device of a high purity gas supply system for a semiconductor. The main body 2 of the filter unit 1 is vertically constituted. As an example thereof, an open bottom end of a filter media 3 having a cylindrical head part is fixed on the projecting portion 5 in the center of the upper surface of a base body 4 and a cylindrical housing 6 is concentrically disposed outside the filter media 3 such that it covers the filter media 3 and the open bottom end of the housing 6 is fixed on the outer periphery of the upper surface of the base body 4. A gas inlet passage 7 communicating with the inside of the filter media 3 is formed at the center of the base body 4 in a vertical direction and a gas outlet passage 8 communicating with the space between the outside of the filter media 3 and the housing 6 is vertically formed at a position shifted in a radial direction. The base body 4 is provided with a collar 9 at the bottom of the periphery thereof and the bottom portion of a nut 10 is fitted on the outer periphery of the upper side of the collar 9. The nut 10 has a collar-like projection at the outer periphery of the upper portion thereof and has an external thread 10a on the outer periphery of the bottom portion thereof.

Figure 3:
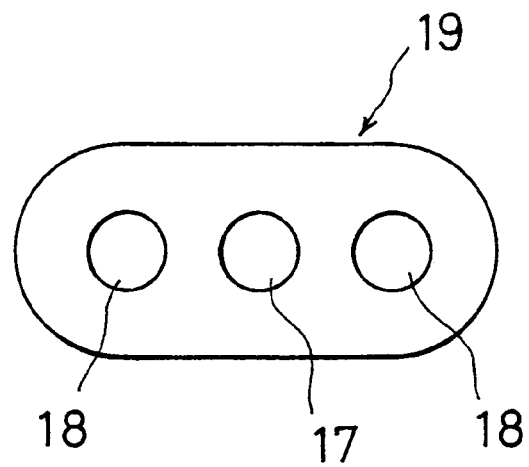
FIG. 3 is a plan view illustrating an example of a gasket used for the filter unit shown in FIG. 2.

The body 4 of the main body 2 constituted like this is inserted into an upward open circular mounting hole 12 formed in the passage block 11 and the external thread 10a of the nut 10 is screwed in the threaded portion 12a formed on the upper portion of the mounting hole 12, whereby the main body 2 is mounted on the passage block 11. In this state, the gas inlet passage 7 of the body 4 is mated with the gas inlet passage 13 of the passage block 11 such that they communicate with each other and the gas outlet passage 8 of the body 4 is mated with the gas outlet passage 14 of the passage block 11 such that they communicate with each other. The bottom joint surface 15 of the body 4 and the bottom joint surface 16 of the mounting hole 12 of the passage block 11 are formed in an elongated circular shape and the projecting portion of the joint surface 15 side is fitted in the recessed portion of the joint surface 16 side and an elongated circular gasket 19 is disposed between both joint surfaces 15, 16, as shown in FIG. 3. The gasket 19 is formed in a single piece having a gas passing hole 17 of the gas inlet side at the center and the gas passing holes 18 of the gas outlet side at both sides thereof, whereby the gas inlet passage 7 communicates with a gas inlet passage 13 via the gas passing hole 17 and the gas outlet passage 8 communicates with the gas outlet passage 14 via one gas passing hole 18. The gasket 19 is sandwiched by the joint surfaces 15, 16 to thereby seal the joint surfaces 15, 16. As described above, one of two gas passing holes 18 of the gas outlet side of the gasket 19 is used and the other hole is not used, but it is not necessary to check the direction of the gasket when it is placed between the joint surfaces 15, 16 and the gasket can be uniformly pressed on the whole surface and has the effect of preventing itself from being turned because it is shaped like an elongated circle.

Figure 4:
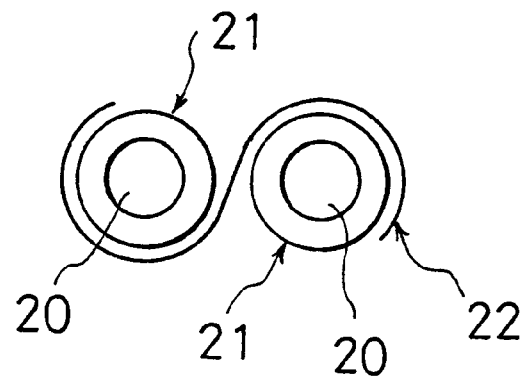
FIG. 4 is a plan view illustrating another example of a gasket used for the filter unit shown in FIG. 2.

Further, the above described gasket 19 is formed in a single piece having the gas passing hole 17 for flowing in the gas and the gas passing holes 18 for flowing out the gas, but, as shown in FIG. 4, as another different example, two different gaskets 21 having a gas passing hole 20 for each may be combined and retained by a retainer 22 shaped like a letter S. In this case, the joint surfaces 15, 16 are formed in an elongated circle corresponding to two gaskets 21.

In a filter unit 1 constituted in the above described manner, the gas passes through the gas inlet passage 13 of the passage block 11, the gas passing hole 17 of the gasket 19, the gas inlet passage 7 of the body 4 and enters the inside of the filter media 3. Then, while the gas passes through the filter media 3, the gas is cleaned and passes between the filter media 3 and the housing 6 and passes through the gas outlet passage 8 of the body 4, the gas passing hole 18 of the gasket 19 and flows out through the gas outlet passage 14 of the passage block 11.

Figure 5:
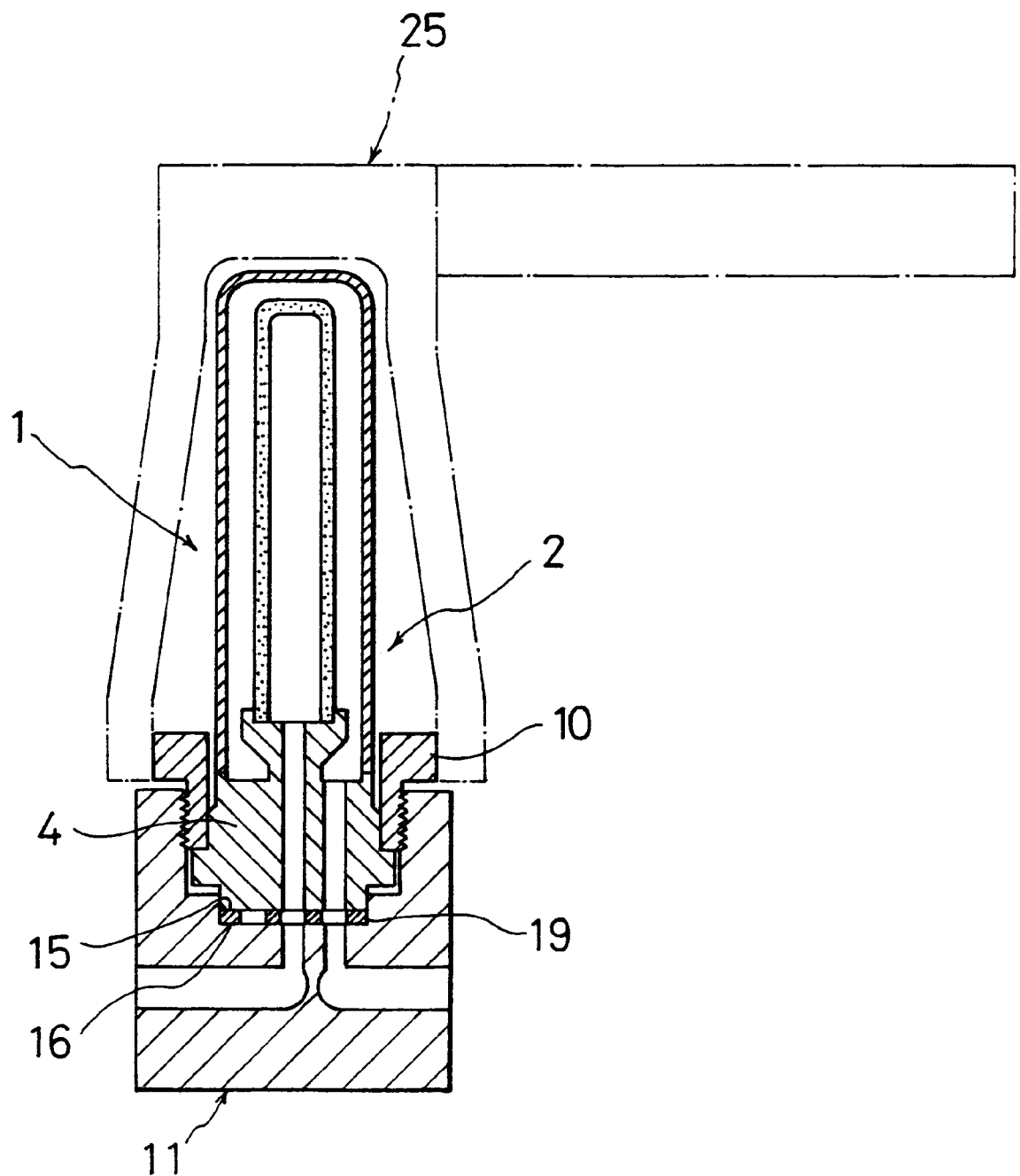
FIG. 5 is a drawing for explaining the removing and mounting operations of the filter unit shown in FIG. 2.

Since the filter unit 1 having the above described constitution is disposed on the outer periphery of the body 4 and is fixed in the passage block 11 by screwing the nut 10 having an external thread 10a, as shown in FIG. 5, the main body 2 can be simply removed from or mounted on the passage block 11 only by loosening or tightening the nut 10 with a special-purpose tool 25 and therefore it is not necessary to disassemble the gas line like a conventional filter unit. Moreover, since the gasket 19 disposed between the joint surface 15 of the body 4 of the main body 2 and the joint surface 16 of the passage block 11 is uniformly pressed by tightening only the nut 10, tight sealing can be ensured. Accordingly, a user can simply perform maintenance such as periodical repair, periodical replacement or the like. Moreover, since the main body 2 of the filter unit 1 is vertically mounted and is compact, it can save space in the gas line.

Figure 6:
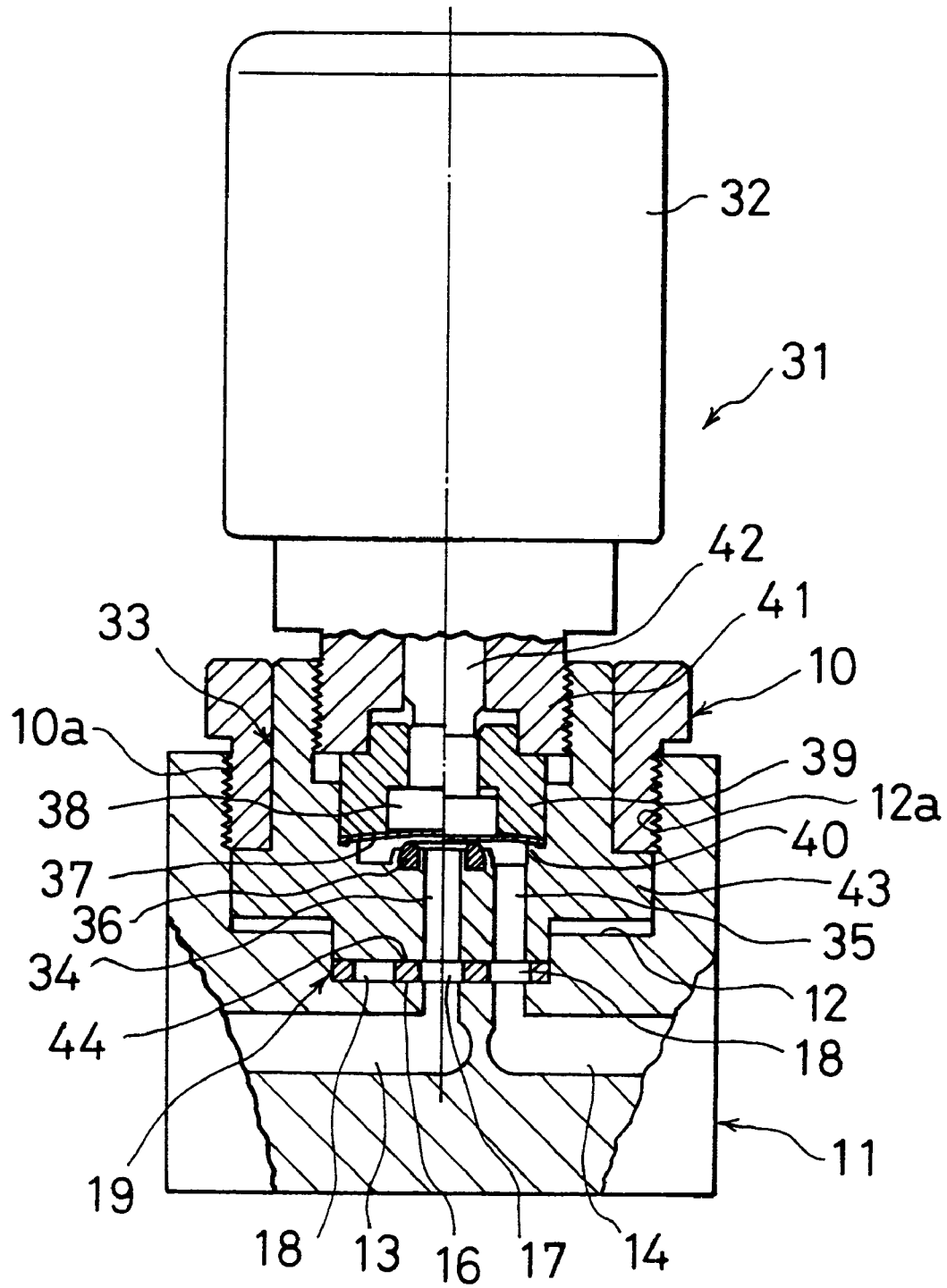
FIG. 6 illustrates the first preferred embodiment of a gas controlling device for integration according to the present invention and is a longitudinal sectional view of the main part thereof applied to an automatic diaphragm valve.

In FIG. 6, a reference numeral 31 designates an automatic diaphragm comprising a driving part 32 and a valve body 33. The valve body 33 is a cylinder with a bottom and a gas inlet passage 34 is formed at the center of the bottom in a vertical direction and a gas outlet passage 35 is formed at the side thereof in the vertical direction. A valve seat 36 is fixed by caulking on the upper open end of the gas inlet passage 34. The valve is closed if the diaphragm 37 of a valve body is tightly pressed on the valve seat 36 by the pressing force of the pressing piece 38 and the valve is opened if the pressing force of the pressing piece 38 on the diaphragm 37 is relieved and the diaphragm 37 is separated from the valve seat 36.

Further, in FIG. 6, a reference numeral 39 designates a bonnet for pressing the peripheral portion of the diaphragm 37 on a projection 40 at the peripheral end of the bottom in the body 33 and a reference numeral 41 designates a connecting outer cylinder of the driving part 32 for tightening the bonnet 39 and a reference numeral 42 designates a piston of the driving part 32 for pressing a pressing piece 38.

A collar 43 is made at the bottom of the outer periphery of the valve body 33 and a nut 10 is fitted on the outer periphery of the upper side of the collar 43. The nut 10 has a collar-like projection on the outer periphery of the upper end thereof and an external thread 10a on the outer periphery of the lower portion thereof. The valve body 33 is inserted into an upward open circular mounting hole 12 formed in the passage block 11 and then the thread 10a of the nut 10 is screwed in the upper threaded portion 12a of the mounting hole 12, whereby the valve body 33 is mounted on the passage block 11. In this state, the gas inlet passage 34 of the valve body 33 is mated with the gas inlet passage 13 of the passage block 11 such that they communicate with each other and the gas outlet passage 35 of the valve body 33 is mated with the gas outlet passage 14 of the passage block 11 such that they communicate with each other. The joint surface 44 of the bottom end of the valve body 33 and the joint surface 16 of the bottom of the mounting hole 12 of the passage block 11 are formed in an elongated circular shape and a projecting portion of the former is fitted in a recessed portion of the latter, as in the case of the above described embodiment. A gasket 19 which has a gas passing hole 17 of a gas inlet side at the center and gas passing hole s 18 of a gas outlet side on both side of the gas passing hole 17 is disposed between these joint surfaces 44, 16 in a state in which the gasket 19 is sandwiched and the joint surfaces 14, 16 are sealed in a state in which the gas passing hole 17 communicates with the gas passages 34, 13 and one of the gas passing holes 18 communicates with the gas passages 35, 14.

Further, instead of the above described gasket 19, as shown in FIG. 4, two gaskets which have a gas passing hole 20 for each and are combined and retained by a retainer 22 shaped like a letter S may be used as in the case of the above described embodiment.

In the automatic diaphragm valve 31 having the above described constitution, when the automatic diaphragm valve 31 is opened, the gas passes through the gas inlet passage 13 of the passage block 11, the gas passing hole 17 of the gasket 19, the gas inlet passage 34 of the body 33 and enters the inside of the body 33. Then, the gas passes through the gas outlet passage 35 of the body 33, the gas passing hole 18 of the gasket 19 and flows out from the gas outlet passage 14 of the passage block 11.

In the automatic diaphragm valve 31 having the above described constitution, since the valve body 33 itself is fixed in the passage block 11 by screwing the nut 10 having an external thread 10a cut on the valve body 33, the valve body 33 can be simply removed from or mounted on the passage block 11 only by loosening or tightening the nut 10 with a special-purpose tool and therefore it is not necessary to disassemble the automatic diaphragm valve 31 or the gas line. Moreover since the gasket 19 disposed between the joint surface 44 of the valve body 33 and the joint surface 16 of the passage block 11 is uniformly tightened by the tightening force of only the nut 10, sealing performance is improved. Accordingly, a user can simply perform the maintenance such as periodical repair, periodical replacement or the like. Further, since the main body is vertically mounted and is made compact, it can save space in the gas line.

Further, although only the filter unit 1 and the automatic diaphragm valve 31 are described as the devices to which the present invention is applied in the present embodiment such that the main body of the device is mounted on the passage b lock 11 with the nut 10 having the external thread 10a, the present invention can be applied to the other devices which are used in the gas controlling device of a high purity gas supply system for a semiconductor, such as a toggle-type manual diaphragm valve, an automatic diaphragm valve with a check valve, a regulator, a mass flow controller, and a mass flow meter or the like. Next, the second embodiment of the present invention using a nut having an internal thread will be hereinafter described.

Figure 7:
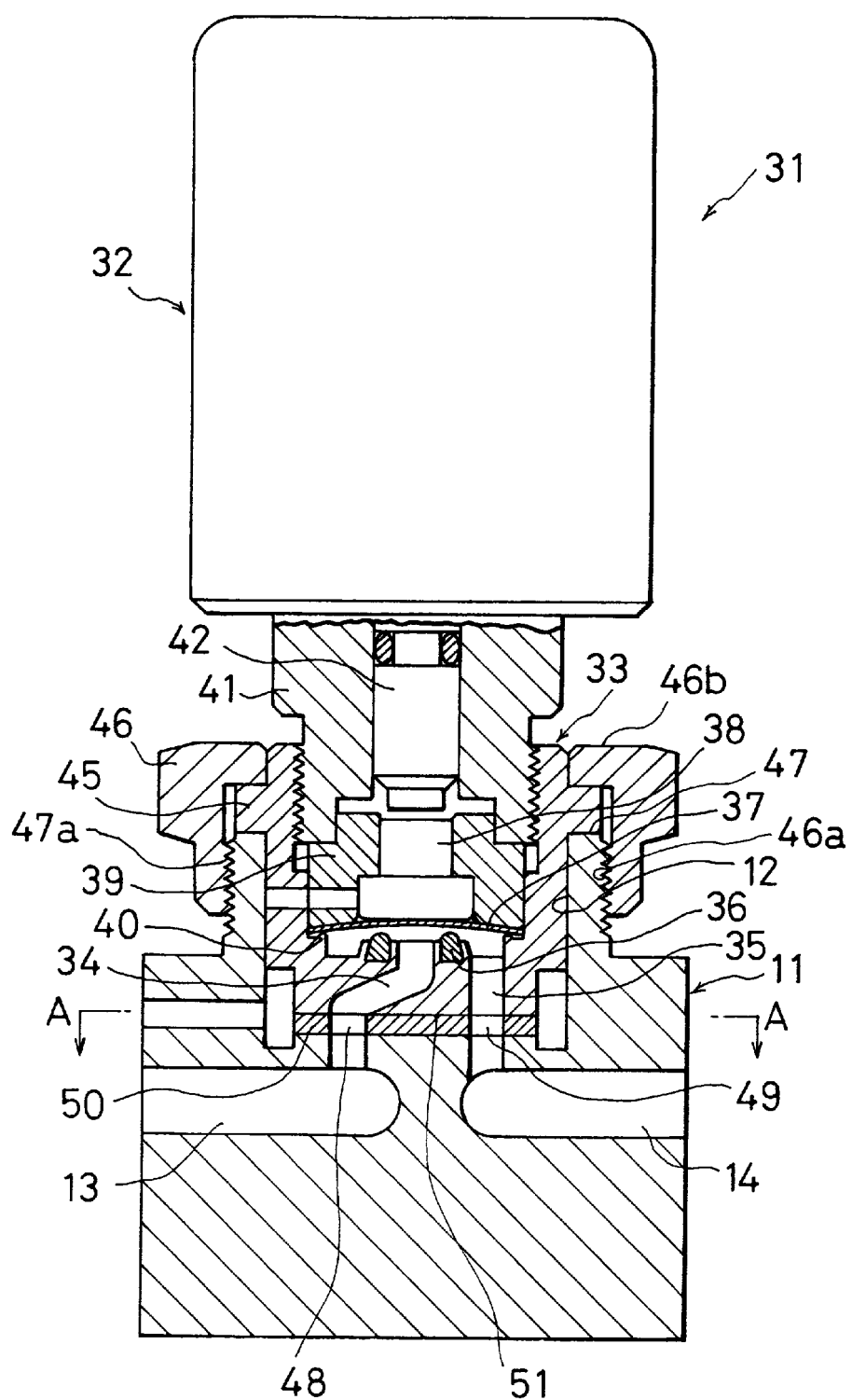
FIG. 7 illustrates the second preferred embodiment of a gas controlling device for integration according to the present invention and is a longitudinal sectional view of the main part thereof applied to an automatic diaphragm valve.

In FIG. 7, a reference numeral 31 designates an automatic diaphragm valve and the whole constitution is similar to the above described preferred embodiment shown in FIG. 6 and like reference numerals designate like parts. Therefore, the description thereof will be omitted and the different constitution will be mainly described.

Figure 8:
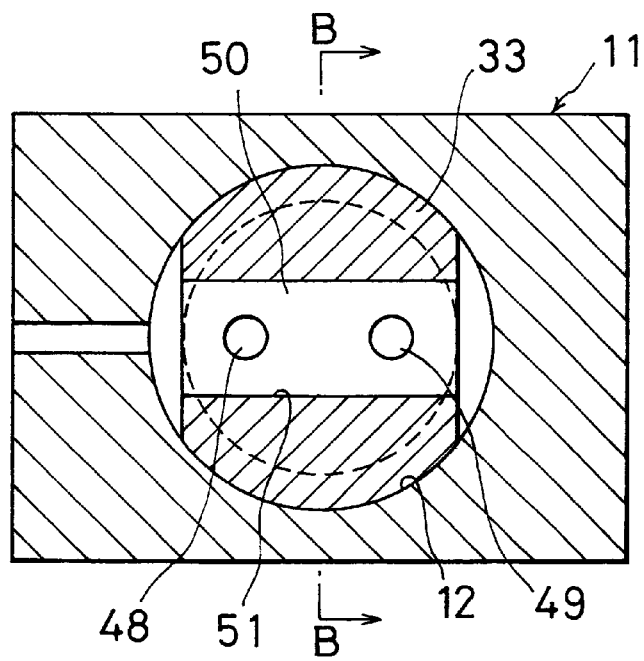
FIG. 8 is a cross sectional view taken on line A—A in FIG. 7 and illustrates a gasket-inserted part in the automatic diaphragm valve.
Figure 9:
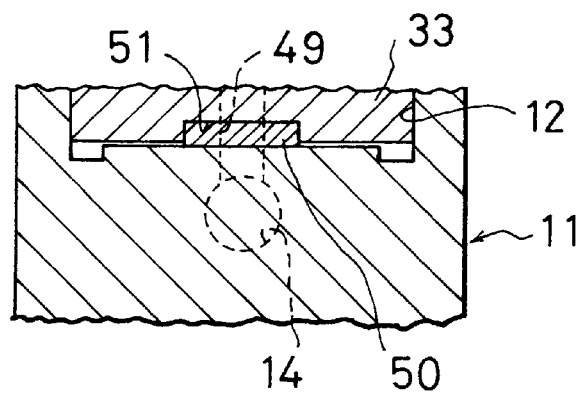
FIG. 9 is a cross sectional view taken on line B—B in FIG. 8.

A collar 45 is made at the upper outer periphery of a valve body 33 and a nut 46 is fitted on the upper part of the body 33. An engaging portion 46b projecting at the upper inner periphery of the nut 46 is engaged with the upper surface of the collar 45. A thread 46a is formed on the inside of the lower portion of the nut 46. The lower part of the valve body 33 is inserted into an upward open circular mounting hole 12 formed in the cylindrical projecting portion 47 of the passage block 11 and then the nut 46 is screwed on the thread 47a formed on the outer peripheral surface of the cylindrical projecting portion 47 and therefore the collar 45 of the body 33 is pressed on the upper end surface of the cylindrical projecting portion 47 of the passage block 11 by the engaging portion 46b of the nut 46, whereby the body 33 is mounted on the passage block 11. In this state, the gas inlet passage 34 of the valve body 33 is mated with the gas inlet passage 13 of the passage block 11 such that they communicate with each other and the gas outlet passage 35 of the valve body 33 is mated with the gas outlet passage 14 of the passage block 11 such that they communicate with each other. A gasket 50 having a gas passing hole 48 of the gas inlet side and a gas passing hole 49 of the gas outlet side is sandwiched between the joint surface of the bottom of the valve body 33 and the joint surface of the bottom of the mounting hole 12 of the passage block 11, as shown in FIG. 8, to thereby seal the joint surfaces. The bottom part of the mounting hole 12 is formed projectingly such that the bottom surface is raised up from the surrounding and, as shown in FIG. 8 and FIG. 9, the gasket 50 is formed in a rectangle and is inserted into the groove 51 formed in the bottom surface of the body 33 and is positioned there. Further, the gasket 50 may be positioned by means of a retainer, if necessary. In an automatic diaphragm valve 31 having the above described constitution, when the automatic diaphragm valve 31 is opened, the gas passes through the gas inlet passage 13 of the passage block 11, the gas passing hole 48 of the gasket 50, the gas inlet passage 34 of the body 33 and enters the inside of the body 33. Then, the gas passes through the gas outlet passage 35 of the body 33, the gas passing hole 49 of the gasket 50 and flows out from the gas outlet passage 14 of the passage block 11.

Since the automatic diaphragm valve 31 having the above described constitution is fixed in the passage block 11 by screwing the nut 46 which is disposed on the outer periphery of the body 33 and has an internal thread 46a, its main body can be simply removed from or mounted on the passage block 11 only by loosening or tightening the nut 46 with a special-purpose tool as in the case of the above described embodiment and therefore it is not necessary to disassemble the gas line. Moreover, since the main body is fixed to the outside of the mounting hole 12 of the passage block 11 by screwing the nut 46 in a state in which the collar 45 of the body 33 is pressed on the upper end surface of the cylindrical projecting portion 47 of the passage block 11, the particles produced at the threaded part when the main body is removed or mounted do not enter the mounting hole 12 of the passage block 11 nor enter the gas passage system. Moreover, since the gasket 50 disposed between the bottom surface of the body 33 and the bottom surface of the passage block 11 is uniformly tightened by the tightening force of only the nut 46, tight sealing performance can be ensured. Furthermore, since the bottom surface of the mounting hole 12 of the passage block 11 is projectingly formed, it can prevent the entry or the building-up of dirt at the sealing surface of the gasket 50 when the body 33 disposed at the lower part of the main body is removed or mounted. Accordingly, even a user can simply perform the maintenance such as periodical repair, periodical replacement or the like. In addition, since the main body 32 of the automatic diaphragm valve 31 is vertically disposed on the gas panel and is made compact, it can save space in the gas line.

Figure 10:
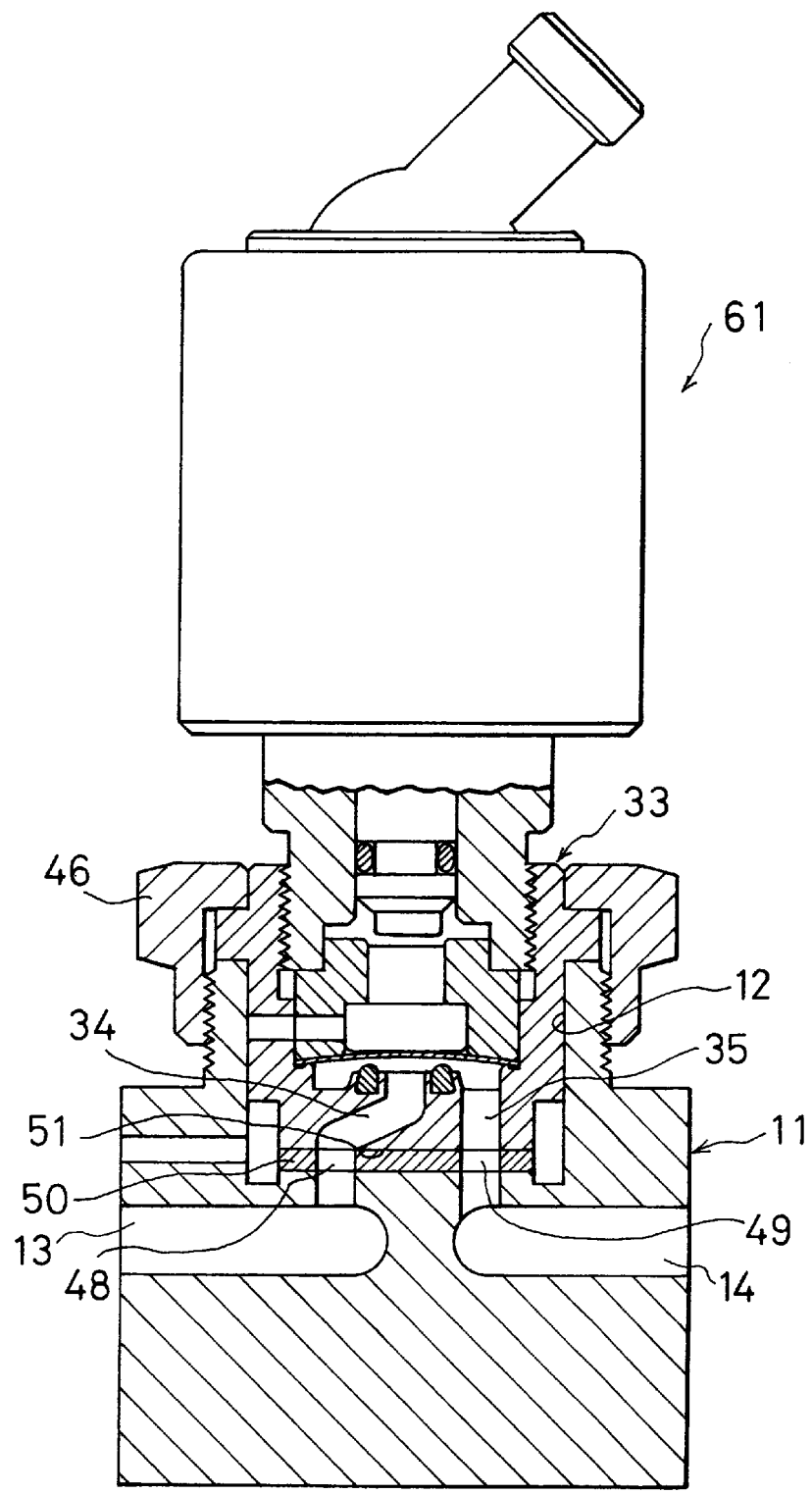
FIG. 10 illustrates the second preferred embodiment of a gas controlling device for integration according to the present invention and is a longitudinal sectional view of the main part thereof applied to a toggle-type manual diaphragm valve.
Figure 11:
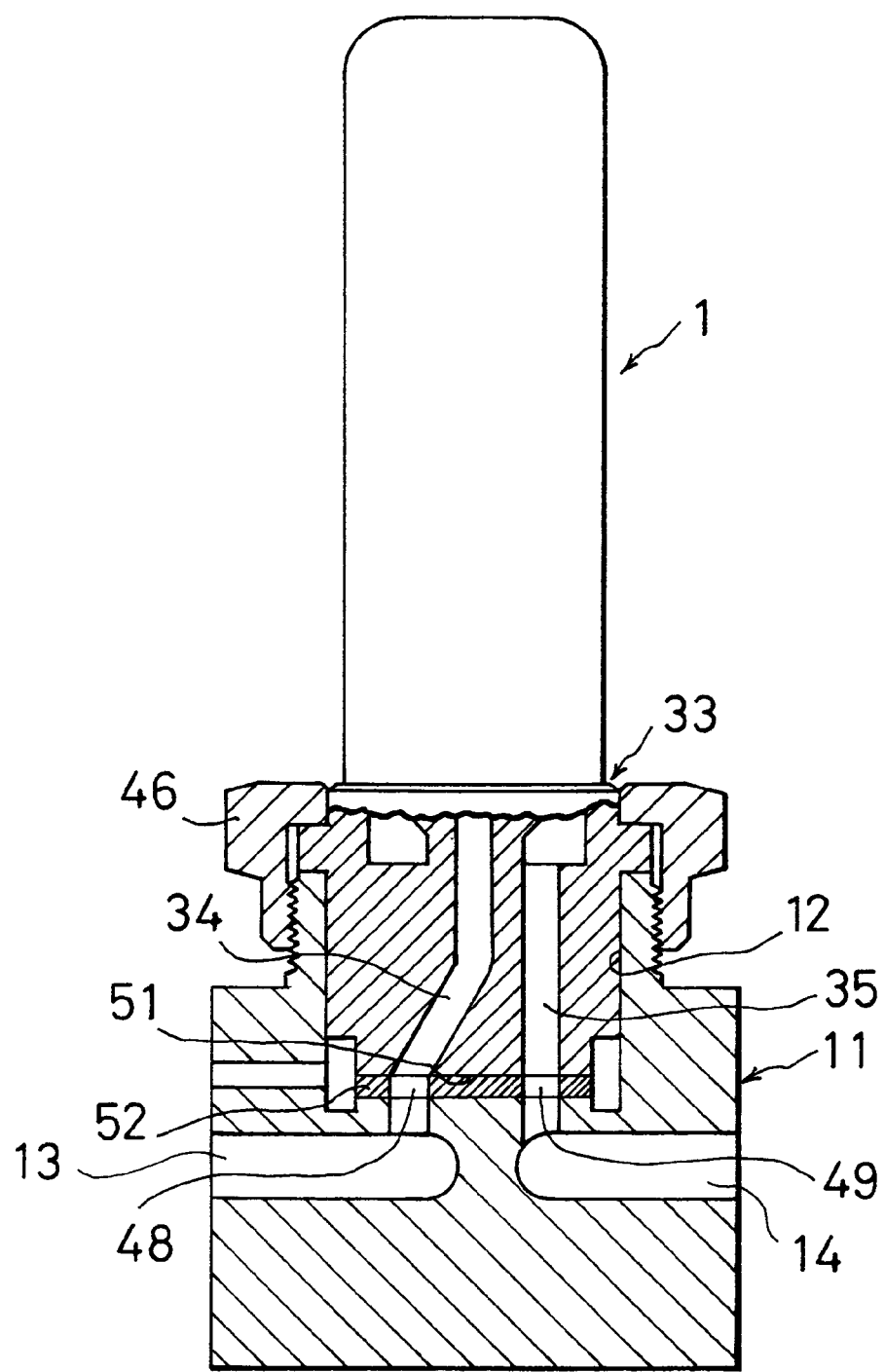
FIG. 11 illustrates the second preferred embodiment of a gas controlling device for integration according to the present invention and is a longitudinal sectional view of the main part thereof applied to a filter unit.
Figure 12:
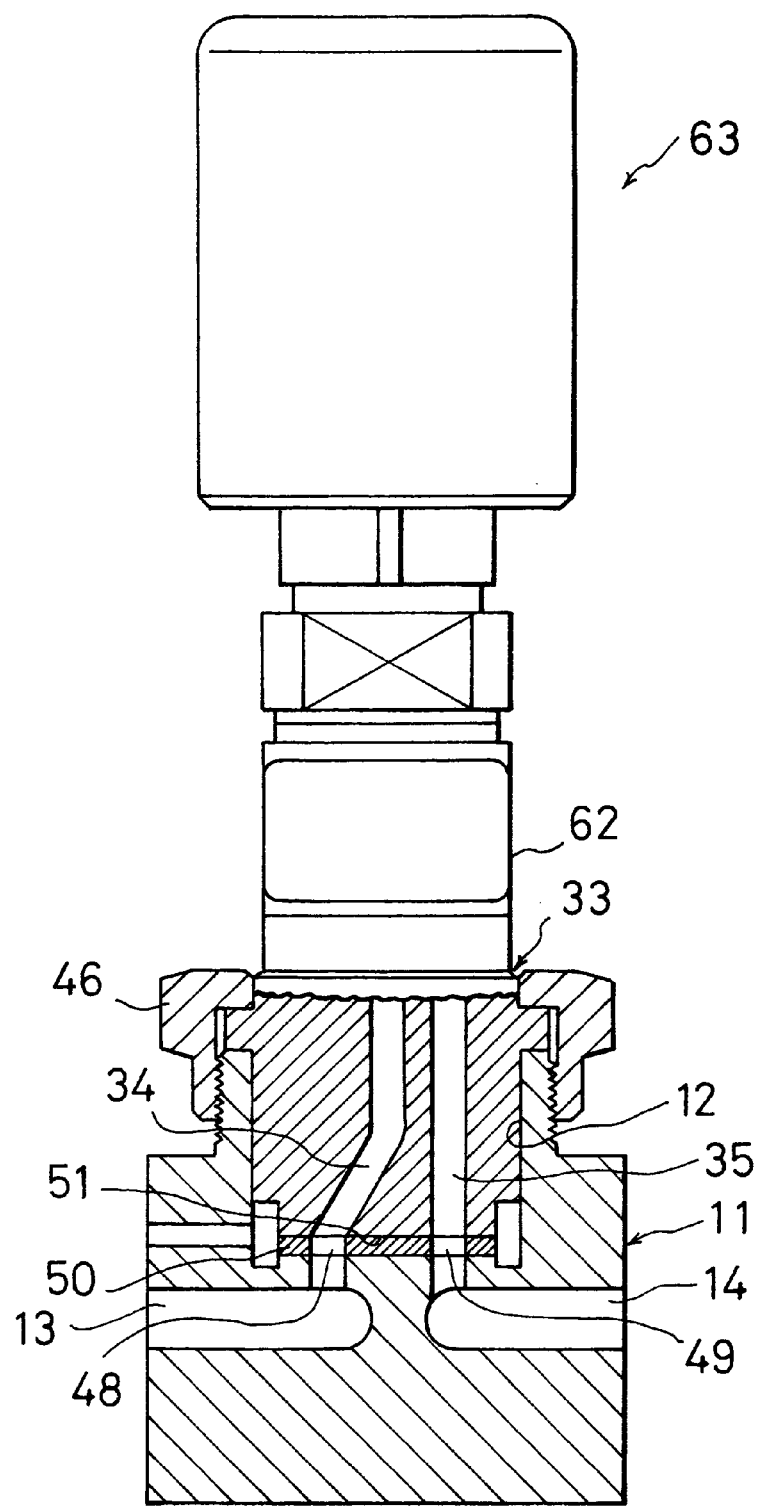
FIG. 12 illustrates the second preferred embodiment of a gas controlling device for integration according to the present invention and is a longitudinal sectional view of the main part thereof applied to an automatic diaphragm valve with a check valve.
Figure 13:
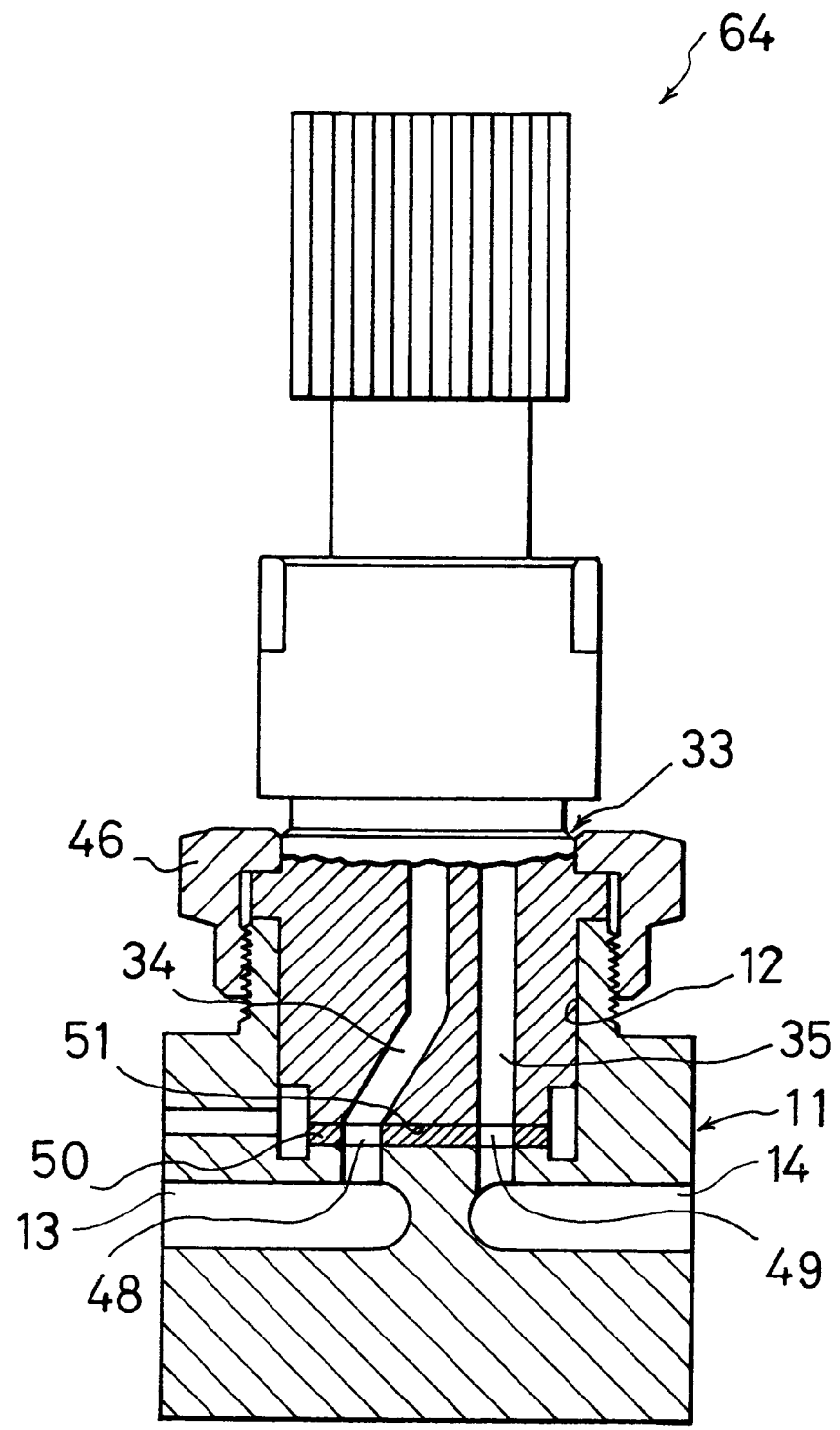
FIG. 13 illustrates the second preferred embodiment of a gas controlling device for integration according to the present invention and is a longitudinal sectional view of the main part thereof applied to a regulator.
Figure 14:
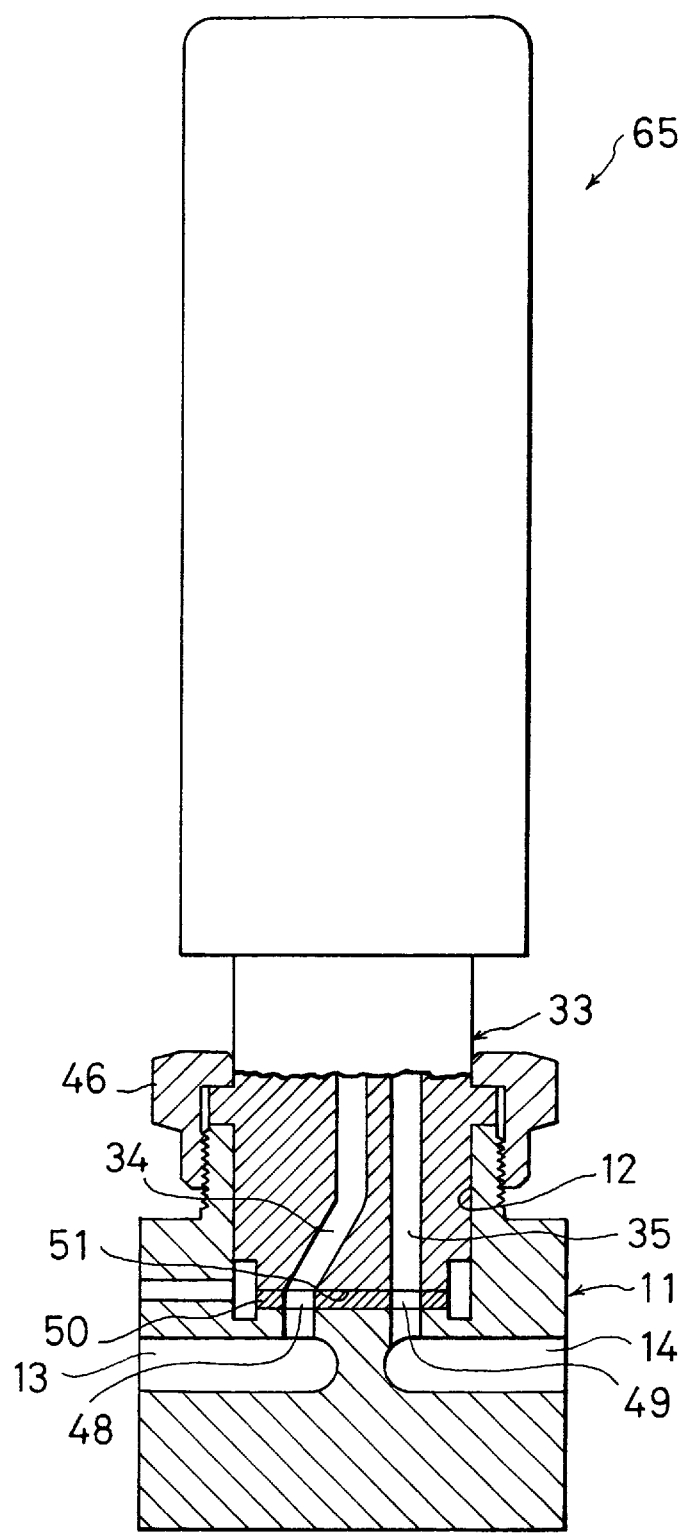
FIG. 14 illustrates the second preferred embodiment of a gas controlling device for integration according to the present invention and is a longitudinal sectional view of the main part thereof applied to a mass flow controller.
Figure 15:
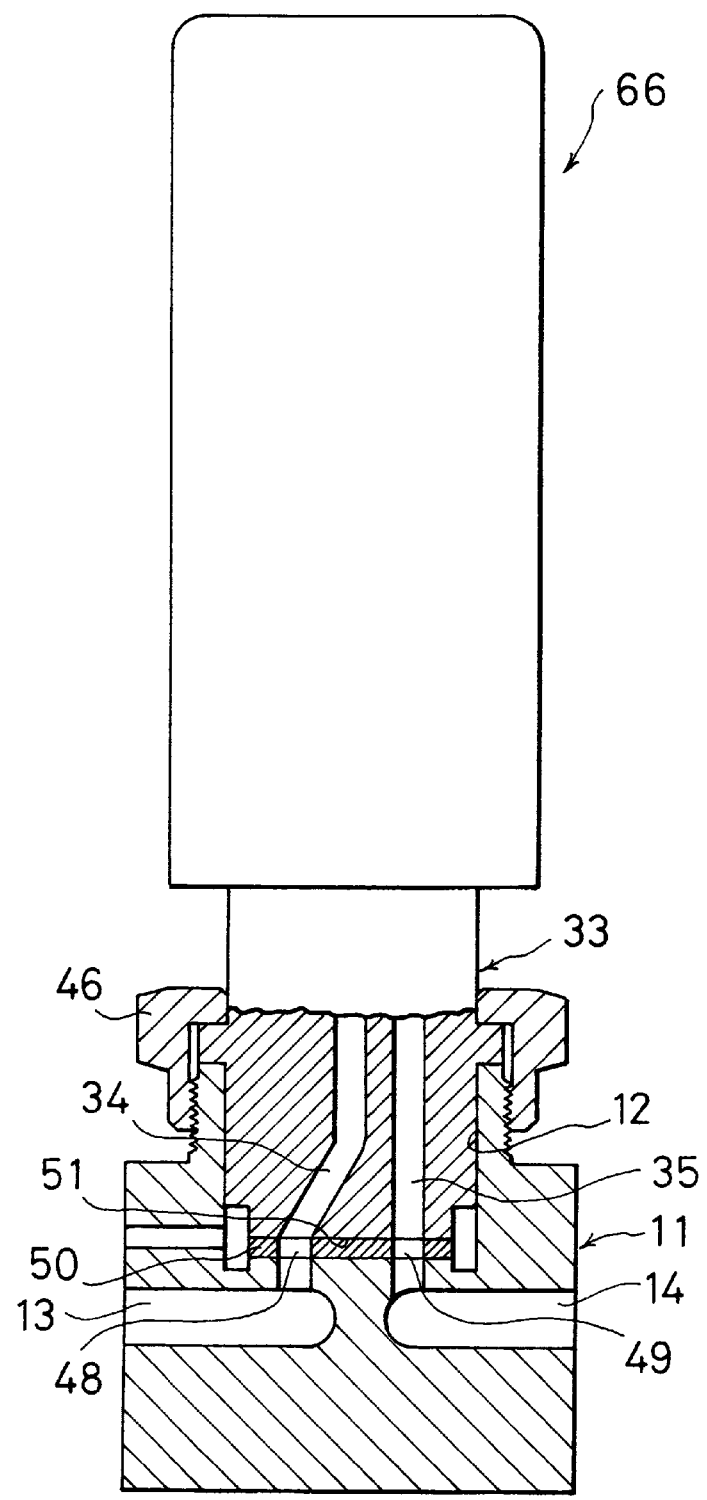
FIG. 15 illustrates the second preferred embodiment of a gas controlling device for integration according to the present invention and is a longitudinal sectional view of the main part thereof applied to a mass flow meter.

In the second embodiment of the present invention using the nut 46 having the internal thread which has been described up to this point, the present invention is applied to the automatic diaphragm valve 31 as a gas controlling device for integration. In a case in which the present invention is applied to a toggle-type manual diaphragm valve 61, the embodiment is constituted as shown in FIG. 10. In the case of a filter unit 1, the embodiment is constituted as shown in FIG. 11. In the case of an automatic diaphragm valve with a check valve 62, the embodiment is constituted as shown in FIG. 12. In the case of a regulator 64, the embodiment is constituted as shown in FIG. 13. In the case of a mass flow controller 65, the embodiment is constituted as shown in FIG. 14. In the case of a mass flow meter 66, the embodiment is constituted as shown in FIG. 15. In every embodiment described above, the main body is vertically constituted, the gas inlet passage 34 and the gas outlet passage 35 being formed in the body 33 disposed at the lower part of the main body, the nut 46 having the internal thread 46a being mounted on the outer periphery of the body 33, the body 33 being inserted into the mounting hole 12 of the passage block 11, and the gas controlling device is fixed to the passage block 11 by screwing the nut 46. Moreover, the bottom surface of the passage block 11 which is opposite to the bottom surface of the body 33 is formed projectingly such that it is raised up from the surrounding and the gasket 50 having gas passing holes 48, 49 is disposed between the projecting bottom surface and the bottom surface of the body 33 to thereby seal the bottom surfaces. Further, the gasket 50 is inserted into the groove 51 of the bottom surface of the body 33 and is positioned there as in the case of the gasket 50 of the above described automatic diaphragm valve 31. Accordingly, the functions and the effects of these gas controlling devices for integration are the same as those of the above described automatic diaphragm valve 31.

What is claimed is:

1. A gas controlling device comprising:
   control means for controlling flow of gas;
   a shielding member for shielding the control means;
   a base body having a gas inlet passage and a gas outlet passage therein, said gas inlet and outlet passages being in communication with said control means, said base body being secured to the shielding member and enclosing the control means;
   a passage block having a gas inlet passage communicating with said gas inlet passage of the base body and a gas outlet passage communicating with said gas outlet passage of the base body, said passage block having a body mounting hole;
   said base body being vertically slidably mounted in said body mounting hole;
   a sealing means disposed between said base body and said passage block and providing communication between said inlet and outlet passages in the base body and the inlet and outlet passages In the passage block;
   a nut abutting on the base body and threadably engaged with the passage block so as to press the base body against the passage block through the interposed sealing means;
   said nut being disengagable from said passage block to enable removal of said gas control means, said shielding member and said base body as a single unit from said passage block to enable various types of fluid flow control devices to be removably mounted within the same said body mounting hole in said passage block.

2. The gas controlling device as claimed in claim 1, wherein said gas controlling device is any one of an automatic diaphragm valve, a toggle-type manual diaphragm valve, a filter unit, an automatic diaphragm valve with a check valve, a regulator, a mass flow controller, and a mass flow meter.

3. A gas controlling device for integration as claimed in claim 1, wherein said nut has an external thread and is screwed in the inside of the mounting hole of said passage block.

4. The gas controlling device as claimed in claim 1, wherein said nut has an internal thread and is screwed on the a cylindrical projecting portion of said passage block.

5. The gas controlling device as claimed in claim 1, wherein said sealing means comprises a gasket disposed at a joint surface between said base body and said passage block and has a plurality of gas passing holes therein.

6. The gas controlling device as claimed in claim 5, wherein said gasket has one said passing hole at a gas inlet side and another said gas passing hole at a gas outlet side and is constituted in one piece.

7. The gas controlling device as claimed in claim 1, wherein the sealing means comprises two gaskets each having a gas passing hole and a retainer for said two gaskets.

8. The gas controlling device as claimed in claim 1, wherein said sealing means comprises a gasket disposed between the bottom surface of said base body and the bottom surface of the mounting hole of said passage block, which is opposite the bottom surface of said base body and is projectingly formed such that it is raised from the surrounding, and has a plurality of gas passing holes.

9. The gas controlling device as claimed in claim 8, wherein said gasket has a gas passing hole at a gas inlet side and a further gas passing hole at a gas outlet side and is constituted in one piece and is inserted into a groove at the bottom surface of said base body to be positioned thereat.

10. The gas controlling device as claimed in claim 1, wherein the control means is selected from the group consisting of a filter, a diaphragm valve, a regulator and a mass flow controller.

* * * * *